(12) United States Patent
Shida

(10) Patent No.: US 7,478,657 B2
(45) Date of Patent: Jan. 20, 2009

(54) PNEUMATIC TIRE WITH GROUND CONTACT SURFACE OF LAND PORTION HAVING CIRCULAR ARCS

(75) Inventor: Zenichirou Shida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 246 days.

(21) Appl. No.: 10/520,680

(22) PCT Filed: Sep. 8, 2003

(86) PCT No.: PCT/JP03/11426

§ 371 (c)(1),
(2), (4) Date: Jan. 11, 2005

(87) PCT Pub. No.: WO2004/024473

PCT Pub. Date: Mar. 25, 2004

(65) Prior Publication Data

US 2005/0241738 A1 Nov. 3, 2005

(30) Foreign Application Priority Data

Sep. 10, 2002 (JP) ............................. 2002-264148

(51) Int. Cl.
*B60C 11/00* (2006.01)
(52) U.S. Cl. .................................. 152/209.15; 152/901
(58) Field of Classification Search ............. 152/209.14, 152/209.15, 209.18, 901
See application file for complete search history.

(56) References Cited

U.S. PATENT DOCUMENTS 4,722,378 A * 2/1988 Carolla et al. .......... 152/209.15

(Continued)

FOREIGN PATENT DOCUMENTS

EP 0 687 582 A1 12/1995

(Continued)

OTHER PUBLICATIONS

International Search Report for PCT/JP03/11426 mailed on Dec. 16, 2003.

*Primary Examiner*—Steven D Maki
(74) *Attorney, Agent, or Firm*—Greer, Burns & Crain, Ltd.

(57) ABSTRACT

A pneumatic tire includes a tread surface having a plurality of main grooves extending straight in a circumferential direction of the tire. The plurality of main grooves defines land portions extending in the tire circumferential direction. The land portions each have a ground contact surface comprising a first circular arc having a single curvature radius in tire meridian cross section. The ground contact surface of at least the land portion which is located second when counted from the outer side of a vehicle when the tire is mounted thereon, is arranged so as to have the first circular arc and at least a second circular arc connected thereto on the vehicle outer side thereof. The circular arc located closer to the vehicle outer side has a smaller curvature radius and is positioned more inwardly away from the tread surface. The ratio d/D of the depth d of an intersection of the circular arc located closest to the vehicle outer side with a vehicle outer sidewall surface of the at least second land portion to the groove depth D of the main groove facing to the vehicle outer sidewall surface is 0.02 to 0.1.

5 Claims, 4 Drawing Sheets

U.S. PATENT DOCUMENTS

| | | | | |
|---|---|---|---|---|
| 5,355,922 | A * | 10/1994 | Kogure et al. | 152/209.18 |
| 5,720,831 | A * | 2/1998 | Aoki et al. | 152/29 |
| 2001/0054464 | A1* | 12/2001 | Tozawa et al. | 152/209.18 |
| 2005/0061410 | A1* | 3/2005 | Meyer et al. | 152/209.14 |

FOREIGN PATENT DOCUMENTS

| | | | |
|---|---|---|---|
| EP | 728599 | * | 8/1996 |
| EP | 1074405 | * | 2/2001 |
| JP | 3-246104 | * | 11/1991 |
| JP | 5-077608 | * | 3/1993 |
| JP | 06-048116 | * | 2/1994 |
| JP | 10-258612 | * | 9/1998 |
| JP | 11-001105 | * | 1/1999 |
| JP | 11-165504 A1 | | 6/1999 |
| JP | 2002-029219 A1 | | 1/2002 |

* cited by examiner

PNEUMATIC TIRE WITH GROUND CONTACT SURFACE OF LAND PORTION HAVING CIRCULAR ARCS

TECHNICAL FIELD

The present invention relates to pneumatic tires, and more particularly, to a pneumatic tire capable of improving uneven wear resistance and turning performance.

TECHNICAL BACKGROUND

Conventionally, there are pneumatic tires having a tread surface in which a plurality of main grooves extend straight in the circumferential direction of the tire to thereby define circumferentially extending ribs (land portions), and pneumatic tires having a tread surface in which, in addition to the main grooves, lateral grooves which extend in the widthwise direction of the tire are disposed in predetermined intervals in the circumferential direction of the tire to define circumferentially extending block rows (land portions) by the main grooves and lateral grooves.

In such pneumatic tires, for example, as shown in FIG. 6, there is a pneumatic tire in which the ribs 13 formed between the main grooves 12 have ground contact surfaces 13x defined by a circular arc C1 in the tire meridian cross section, the circular arc C1 having a radius R1 of curvature which is the same as the radius R0 of curvature of a circular arc C0 defining the profile of the tread surface 11.

In pneumatic tires of this type, a ground contact pressure focuses on the outer end 13a of each rib 13 located on the outer side M of a vehicle when the tire is mounted on the vehicle under service conditions which cause a great turning force, such as running of a circuit, and therefore, uneven wear such that the outer end wears locally is apt to occur. In particular, a high ground contact pressure is applied to the outer end 13a of a second land portion 13N when counted from the vehicle outer side M. Therefore, the outer end 13a thereof wears significantly, and there is a problem of deteriorating uneven wear resistance to a large extent.

Also, concentration of a ground contact pressure on each outer end 13a causes the inner end 13b of each of the land portions 13 to be susceptible to lifting and sliding. Especially, the inner end 13b of the second land portion 13N is greatly lifted and slid, resulting in creation of a problem of lowering a turning force.

DISCLOSURE OF THE INVENTION

An object of the present invention is to provide a pneumatic tire which can improve uneven wear resistance and turning performance under service conditions that cause a great turning force, such as running of a circuit.

In order to achieve the above object, a pneumatic tire according to present invention includes a tread surface having a plurality of main grooves extending straight in a circumferential direction of the tire, land portions extending in the tire circumferential direction being defined by the plurality of main grooves, the land portions each having a ground contact surface comprising a first circular arc having a single curvature radius in tire meridian cross section, wherein the ground contact surface of at least the land portion which is located second when counted from the outer side of a vehicle when the tire is mounted thereon, is arranged so as to have the first circular arc and at least a second circular arc connected thereto on the vehicle outer side thereof, wherein the circular arc located closer to the vehicle outer side has a smaller curvature radius and is positioned more inwardly away from the tread surface, and wherein the ratio d/D of the depth d, from the tread surface, of an intersection of the circular arc located closest to the vehicle outer side with a vehicle outer sidewall surface of the at least second land portion to the groove depth D of the main groove facing to the vehicle outer sidewall surface is 0.02 to 0.1.

As described above, the ground contact surface of the second land portion, when counted from the vehicle outer side, which significantly deteriorates uneven wear resistance and turning performance is arranged so as to have a conventional first circular arc and at least a second circular arc with a smaller curvature radius connected thereto on the vehicle outer side thereof, and the relationship between the depth d of an intersection of the second circular arc with the vehicle outer sidewall surface of the second land portion is specified as mentioned above, whereby the outer end of the second land portion is effectively sunk radially inward of the tire from the tread surface.

Therefore, a more even distribution of the ground contact pressure on the second land portion can be obtained when a great turning force is applied thereto, for example, when running a circuit, whereby a high ground contact pressure applied onto the outer end can be avoided. Accordingly, uneven wear resistance can be improved, and turning performance can also be improved by suppressing the lowering of a turning force since the inner end side of the second land portion can be prevented from lifting and sliding.

Another pneumatic tire according to present invention includes a tread surface having a plurality of main grooves extending straight in a circumferential direction of the tire, land portions extending in the tire circumferential direction being defined by the plurality of main grooves, the land portions each having a ground contact surface comprising a first circular arc having a single curvature radius in tire meridian cross section, wherein the ground contact surface of at least the land portion which is located second when counted from the outer side of a vehicle when the tire is mounted thereon, is arranged so as to have the first circular arc and a curved line connected thereto on the vehicle outer side thereof, wherein the curved line is formed so as to extend more inwardly away from the tread surface toward the vehicle outer side, and wherein the ratio d/D of the depth d, from the tread surface, of an intersection of the curved line with a vehicle outer sidewall surface of the at least second land portion to the groove depth D of the main groove facing to the vehicle outer sidewall surface is 0.02 to 0.1.

Such arrangement can also improve uneven wear resistance and turning performance under service conditions which cause a great turning force, such as running of a circuit, in the same way as described above.

BEST MODES FOR CARRYING OUT THE INVENTION

The embodiments of the present invention will be described in detail below with reference to the drawings.

Figure 1:
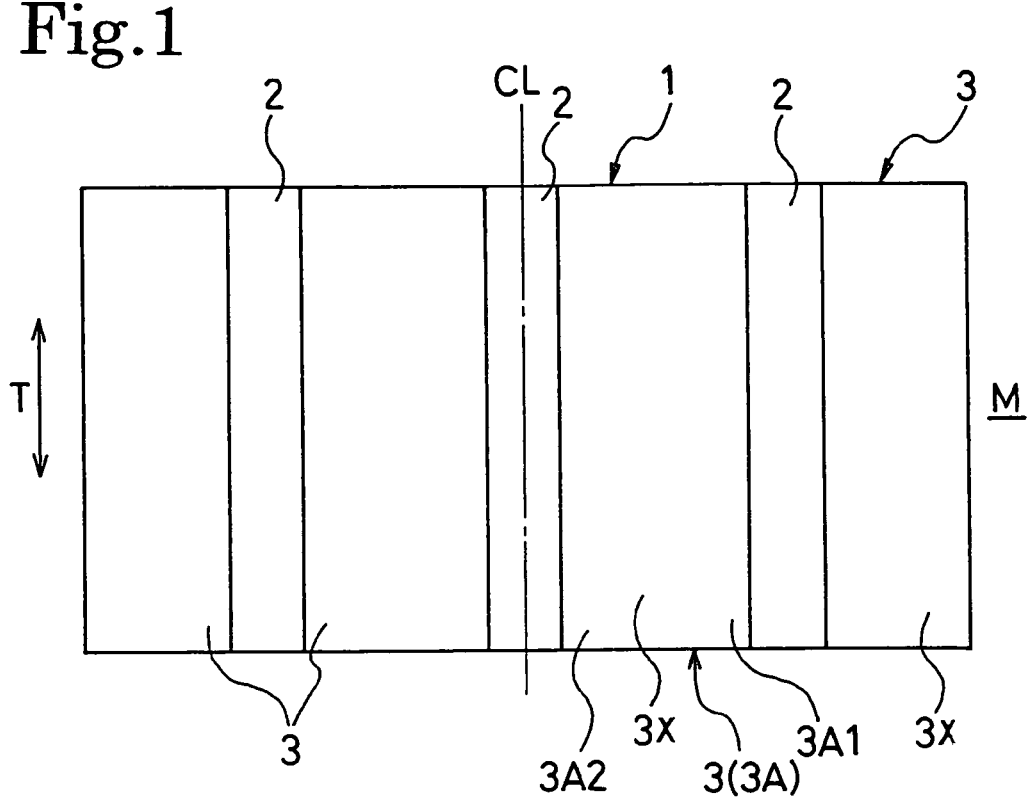
FIG. 1 is a partial front view of a tread surface showing an embodiment of a pneumatic tire according to the present invention.

Referring to FIG. 1, there is shown an embodiment of a pneumatic tire according to the present invention, in which a tread surface 1 has a plurality of (three in the drawing) main grooves 2 which extend straight along a circumferential direction T of the tire, and ribs (land portions) 3 extending in the tire circumferential direction T are defined by the main grooves 2. Reference character CL denotes a tire center line.

Figure 2:
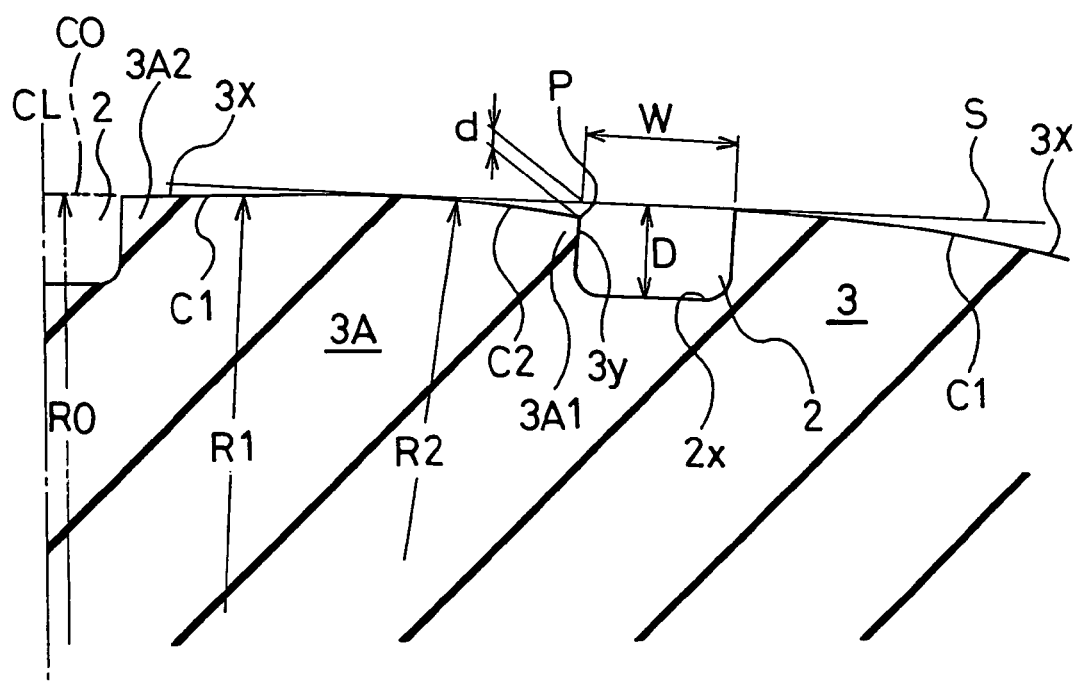
FIG. 2 is a tire meridian partial enlarged cross-sectional view of the tire of FIG. 1.

The land portion 3A which located second when counted from the outer side M of a vehicle when the tire is mounted thereon, has a ground contact surface 3x which consists of a first circular arc C1 having a curvature radius R1, and a second circular arc C2 having a curvature radius R2, as shown in a cross-sectional drawing of FIG. 2 taken along the meridian of the tire, the second circular arc C2 being connected to the first circular arc C1 on the tire outer side thereof.

The first circular arc C1 is identical to a circular arc C0 with a curvature radius R0 defining the profile of the tread surface 1, and the first circular arc C1 and the second circular arc C2 are connected to each other on the same tangent line. The ground contact surface 3x of each of other land portions 3 consists of the first circular arc C1 having a curvature radius R1.

The curvature radius R2 of the second circular arc C2 located on the vehicle outer side (the outer end 3A1 of the land portion 3A) is smaller than the curvature radius R1 of the first circular arc C1, and the second circular arc C2 is formed such that it extends progressively inwardly away from the circular arc C0 defining the profile of the tread surface 1 to the vehicle outer side end of the second circular arc.

The ratio d/D of the depth d, from the circular arc C0, of the intersection P of the second circular arc C2 with the vehicle outer sidewall surface 3y of the second land portion 3A facing to the main groove 2 on the outer side thereof to the groove depth D of the outer side main groove 2 ranges from 0.02 to 0.1. The depth d of the intersection P is the length measured in a direction orthogonal to the tire axis from a tangent line S to the intersection P, the tangent line S being a tangent line drawn in FIG. 2 between the ground contact surfaces 3x of the land portions 3 located on the both sides of the main groove 2 which is on the outer side of the second land portion 3A. The depth D of the main groove 2 is the length measured in a direction orthogonal to the tire axis from the groove bottom 2x to the tangent line S in the center of the groove width.

According to the present invention, the ground contact surface 3x of the land portion 3A which provides a great affectation to the deterioration of uneven wear resistance and turning performance has the second circular arc C2 with a smaller curvature radius which is connected to the conventional first circular arc C1 on the vehicle outer side thereof, and the depth d of the intersection P of the second circular arc C2 with the vehicle outer sidewall surface 3y of the land portion 3A is specified as described above, whereby the outer end 3A1 is effectively sunk tire-radially inward from the position of the conventional tread surface to thereby allow for a more even distribution of ground contact pressure of the tread surface when a great turning force is applied thereto. Therefore, concentration of ground contact pressure on the outer end 3A1 can be avoided.

Accordingly, uneven wear resistance can be improved, and turning performance can also be improved since the inner end 3A2 side of the land portion 3A can be prevented from lifting and sliding.

If the ratio d/D is less than 0.02, it is difficult to effectively improve turning performance and uneven wear resistance. If the ratio d/D is more than 0.1, turning performance can not effectively be improved.

Figure 3:
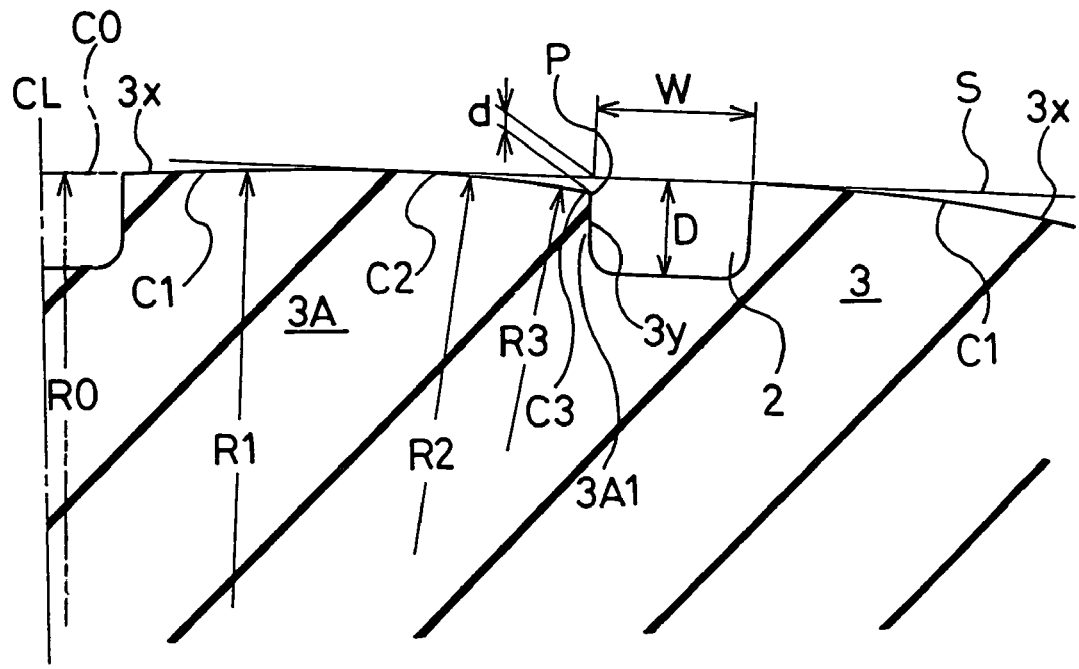
FIG. 3 is a tire meridian partial enlarged cross-sectional view showing an alternative embodiment of a pneumatic tire according to the present invention.

Referring to FIG. 3, there is shown an alternative embodiment of a pneumatic tire according to the present invention. The ground contact surface 3x of the second land portion 3A consists of a first circular arc C1 with a curvature radius R1, a second circular arc C2 with a curvature radius R2 and a third circular arc C3 with a curvature radius R3, the curvature radii R1, R2 and R3 being different from one another. The curvature radius R1 of the first circular arc C1 is the greatest of the curvature radii R1, R2 and R3, and the curvature radius R3 of the third circular arc C3 located on the vehicle outer side is the smallest thereof.

The ground contact surface 3x consists of the three circular arcs C1, C2 and C2, as described above, and the ratio d/D of the depth d of the intersection P of the third circular arc C3 on the vehicle outer side with the vehicle outer sidewall surface 3y of the second land portion 3A facing to the main groove 2 on the outer side thereof to the groove depth D of the main groove 2 facing to the vehicle outer sidewall surface 3y is set in the same way as described above, thereby allowing the same effects as mentioned above to be obtained.

In the present invention, referring to the relationship between the depth d of the above intersection P and the groove width W of the main groove 2, the ratio d/W may range from 0.01 to 0.15. If the ratio d/W is less than 0.01, it is difficult to effectively improve turning performance and uneven wear resistance, and if the ratio d/W is more than 0.15, turning performance can not effectively be improved.

In the case of the ground contact surface 3x consisting of the first and second circular arcs C1 and C2 as shown in the embodiment of FIG. 2, the ratio R1/R2 of the curvature radius R1 of the first circular arc C1 to the curvature radius R2 of the second circular arc C2 may be 2 to 10. If the ratio R1/R2 is less than 2, the effect of improving turning performance is small. If the ratio R1/R2 is more than 10, the effects of improvement in turning performance and uneven wear resistance are small.

In the case of the ground contact surface 3x consisting of the first, second and third circular arcs C1, C2 and C3, as shown in the embodiment of FIG. 3, referring to the relationships between the curvature radii R1, R2 and R3 of the circular arcs C1, C2 and C3, it is preferable that the ratio R1/R2 and the ratio R2/R3 be 2 to 10, respectively. If each ratio is less than 2, the effect of improving turning performance is small. If each ratio is more than 10, the effects of improvement in turning performance and uneven wear resistance are small.

In the present invention, the ground contact surface mentioned above may consist of a plurality of circular arcs which are three or more, and may comprise the first circular arc C1 and at least the second circular arc C2 connected thereto on the vehicle outer side thereof, in which the circular arc located closer to the vehicle outer side has a smaller curvature radius. In this case, the depth d of the intersection P is the depth of an intersection of the circular arc located nearest to the vehicle outer side with the vehicle outer sidewall surface $3y$.

Figure 4:
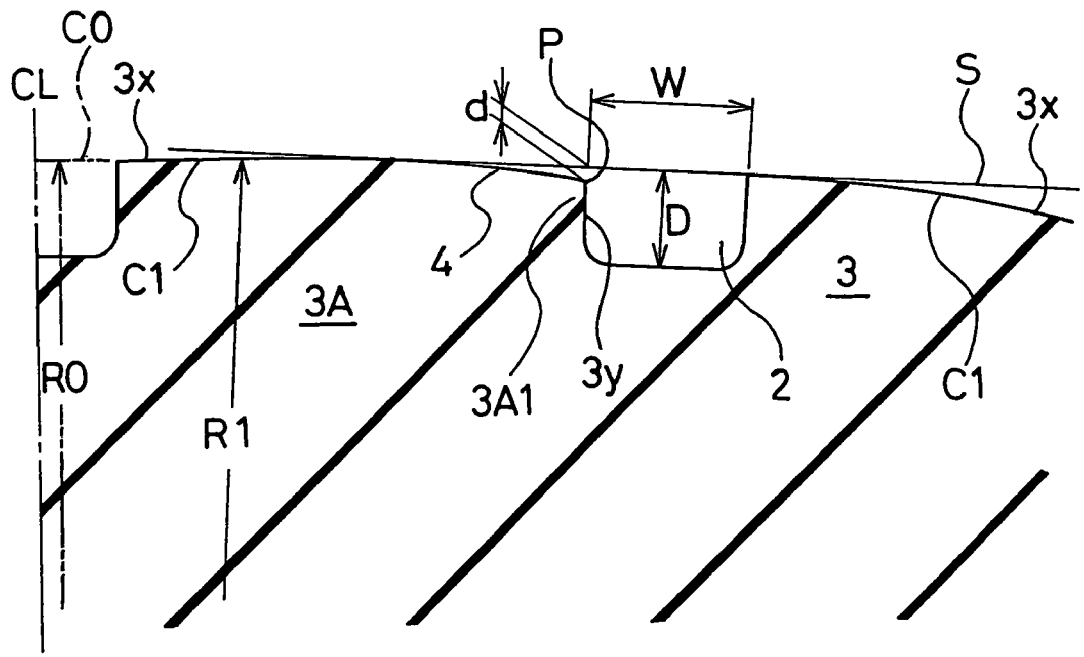
FIG. 4 is a tire meridian partial enlarged cross-sectional view showing another alternative embodiment of a pneumatic tire according to the present invention.

As shown in FIG. 4, the ground contact surface $3x$ may also consist of the first circular arc C1 and a curved line 4 connected thereto on the same tangent line on the vehicle outer side thereof, the curved line 4 having such curvature radii that they are smaller in a continuous fashion toward the vehicle outer sidewall surface $3y$, and being formed such that the curved line extends progressively inwardly away from the circular arc C0 defining the profile of the tread surface 1 to the vehicle outer side end of the curved line. In the case of employing such curved line 4 also, the ratio d/D of the depth d, from the circular arc C0, of the intersection P of the curved line 4 with the vehicle outer sidewall surface $3y$ to the groove depth D of the main groove 2 facing to the vehicle outer sidewall surface $3y$ is set to the same range as described above, thereby allowing the same effects to be obtained.

Figure 5:
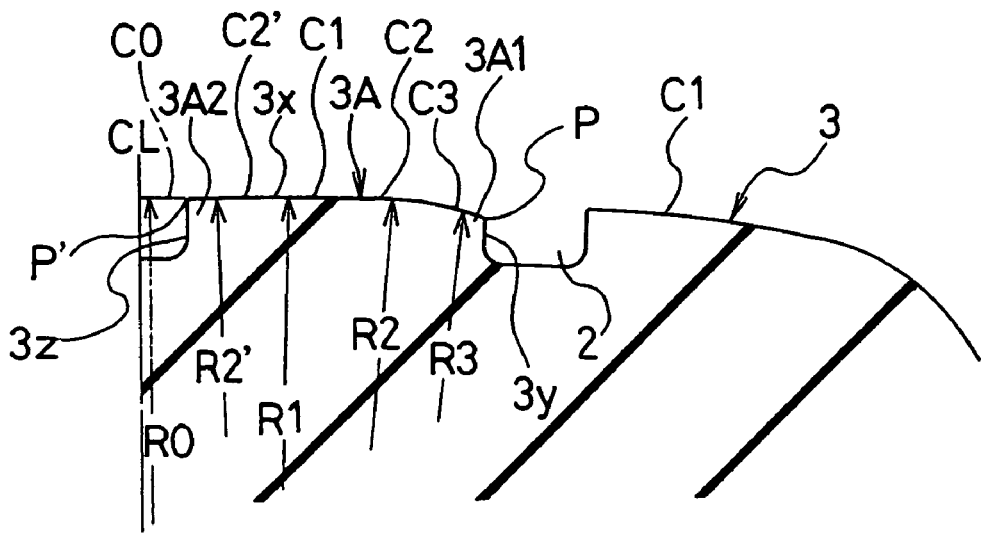
FIG. 5 is a tire meridian partial enlarged cross-sectional view showing still another alternative embodiment of a pneumatic tire according the present invention.

As shown in FIG. 5, the ground contact surface $3x$ may also include an inner circular arc C2' which is smaller in curvature radius than the first circular arc C1 and is connected to the first circular arc C1 on the same tangent line on the vehicle inner side thereof, the inner circular arc being formed such that the section of the ground contact surface $3x$ positioned at the inner end 3A2 of the land portion $3a$ extends progressively inwardly away from the circular arc C0 defining the profile of the tread surface 1 toward the vehicle inner side.

Consequently, when turning to such an opposite direction that the inner end 3 of the land portion $3a$ is located on the outer side relative to the turning, a ground contact pressure focusing on the inner end 3A2 can be avoided. Therefore, uneven wear resistance of the inner end 3A2 can be improved, and turning performance in turning to the opposite direction can be enhanced.

With Reference to the relationship between the curvature radius R2' of the circular arc C2' and the curvature radius R1 of the first circular arc C1, the ratio R1/R2' may be 2 to 10. If the ratio R1/R2' is less than 2, the effect of improving turning performance in turning to the opposite direction is small, and if the ratio R1/R2' is more than 10, the effects of improvement in turning performance in turning to the opposite direction and uneven wear resistance of the inner end 3A2 are small.

The ratio d'/D of the depth d' of the intersection P' of the circular arc C2' with the vehicle inner sidewall surface $3z$ of the second land portion 3A facing to the main groove 2 on the inner side thereof to the groove depth D of the main groove 2 may range from 0.01 to 0.1. If the ratio d'/D is less than 0.01, it is difficult to effectively improve turning performance in turning to the opposite direction and uneven wear resistance of the inner end 3A2. If the ratio d'/D is more than 0.1, turning performance in turning to the opposite direction can not effectively be improved.

In the embodiments mentioned above, only the ground contact surface $3x$ of the second land portion 3A when counted from the vehicle outer side M is formed as described above. However, the ground contact surface $3x$ of the third or fourth land portion 3 may have the same arrangement, and at least the ground contact surface $3x$ of the second land portion 3A which greatly affects the lowering of uneven wear resistance and turning performance may be formed as described above.

The main grooves 2 referred in the present invention have groove widths equal to or greater than 2% of the tire nominal width, and circumferentially extending grooves having groove widths narrower than those do not correspond to the main grooves of the present invention referred herein.

In the above embodiments, examples are shown of the case where there are provided ribs as land portions. However, the present invention may include tires which have tread patterns of FIG. 1 further including lateral grooves extending in the tire widthwise direction in predetermined intervals along the tire circumferential direction and are provided with land portions comprising block rows extending in the tire circumferential direction T instead of the ribs.

EXAMPLE 1

Tires 1, 2 and 3 according to the present invention were prepared, respectively, having an equal tire size of 235/45ZR17, the present invention tires 1 each having a tread pattern shown in FIG. 1 in which the ground contact surface of the second land portion, when counted from the outer side of a vehicle when the tire was mounted thereon, consisted of two circular arcs C1 and C2 with curvature radii R1 and R2 as shown in FIG. 2, the present invention tires 2 each having a tread pattern shown in FIG. 1 in which the ground contact surface of the second land portion consisted of three circular arcs C1, C2 and C3 with curvature radii R1, R2 and R3 as shown in FIG. 3, the present invention tires 3 each having a tread pattern shown in FIG. 1 in which the ground contact surface of the second land portion consisted of four circular arcs C1, C2, C3 and C2' with curvature radii R1, R2, R3 and R2' as shown in FIG. 5.

Figure 6:
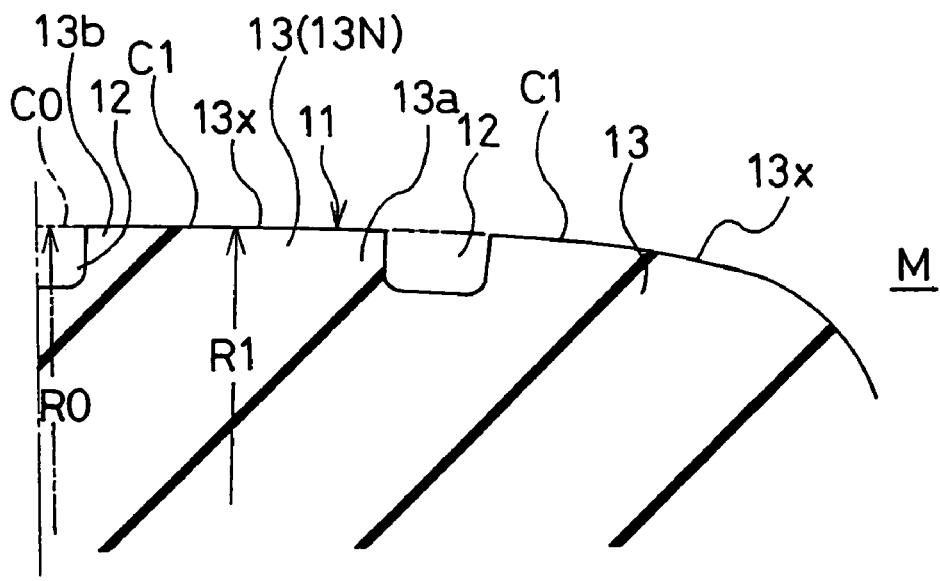
FIG. 6 is a tire meridian partial enlarged cross-sectional view showing a conventional pneumatic tire.
Figure 7:
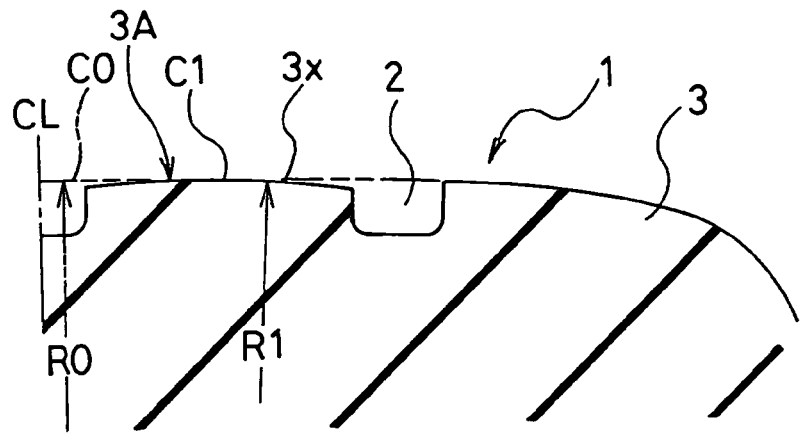
FIG. 7 is a tire meridian partial enlarged cross-sectional view showing the comparative tire 1 used in Example.
Figure 8:
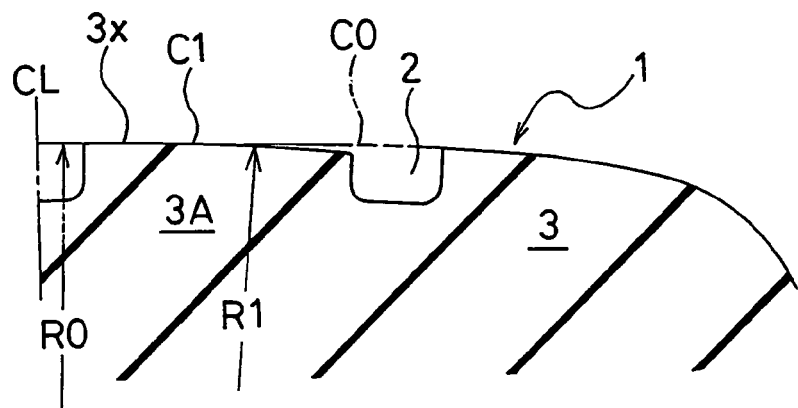
FIG. 8 is a tire meridian partial enlarged cross-sectional view showing the comparative tire 2 used in Example.
Figure 9:
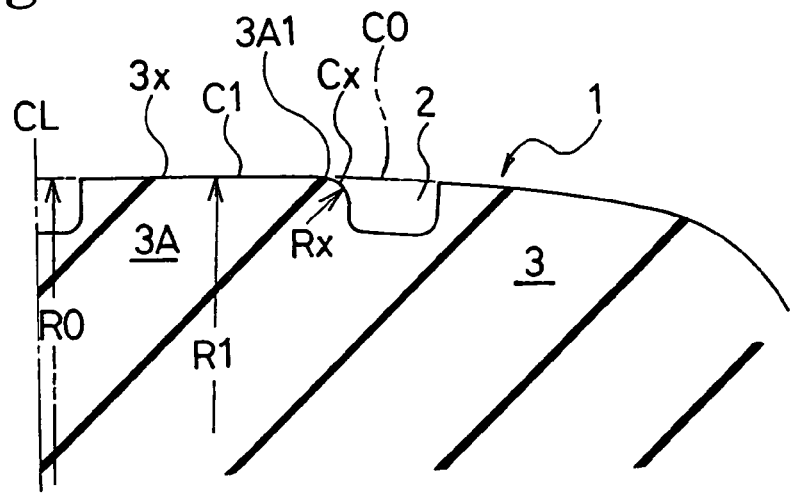
FIG. 9 is a tire meridian partial enlarged cross-sectional view showing the comparative tire 3 used in Example.

Conventional tires each having an arrangement shown in FIG. 6, and comparative tires 1 to 4 were also prepared, respectively, the comparative tires 1 and 2, as shown in FIGS. 7 and 8, having second land portions the ground contact surfaces of which consisted of a circular arc C1 having a curvature radius R1 smaller than the curvature radius R0 of the circular arc C0 defining the profile of the tread surface, the comparative tires 3, as shown in FIG. 9, having the same arrangement as the conventional tire of FIG. 6 except that the outer end of the second land portion was chamfered with an circular arc having a radius Rx, the comparative tires 4 having the same arrangement as the present invention tire 2 except that the curvature radius R1 was larger than the curvature radius R2 and the curvature radius R2 was smaller than the curvature radius R3.

Tires 4 to 6 according to the present invention and comparative tires 5 and 6 were further prepared, respectively, each having an arrangement shown in FIG. 3 and the ratio d/D of the depth d of the intersection to the groove depth D of the main groove varied as shown in Table 1. The curvature radii R0, R1, R2, R3 and R2' of the circular arcs and the ratios d/W were as shown in Table 1.

Each test tire was mounted on a 17×8JJ sized rim, and an air pressure of 220 kPa was applied thereto. The evaluation tests for turning performance and uneven wear resistance were performed in the following measurement methods, obtaining the results shown in Table 1.

Turning Performance

Each test tire was attached to an indoor drum test machine and a cornering force applied thereto was measured under conditions of a load of 4.0 kN, a running speed of 100 km/h, a slip angle of 4 degrees, and a camber angle of 3 degrees. The evaluation results of the test tires were represented by the index on the basis of the conventional tire as 100. The greater the index value, the better the turning performance. The index value equal to or more than 105 is of a remarkable effect.

Uneven Wear Resistance

Each test tire was attached to a four-wheel driven car of 2 litter displacement, and the amount of wear of the second land portion thereof was measured after running a circuit course of 2.1 km ten times. The results of the test tires were evaluated by a 10-point method. The greater the value, the better the uneven wear resistance. The value equal to or more than 7 is practically effective in improvement.

TABLE 1

|  | Conventional Tire | Comparative Tire 1 | Comparative Tire 2 | Comparative Tire 3 | Comparative Tire 4 |
|---|---|---|---|---|---|
| R0 (mm) | 1000 | 1000 | 1000 | 1000 | 1000 |
| R1 (mm) | 1000 | 335 | 600 | 1000 | 1000 |
| R2 (mm) | — | — | — | — | 100 |
| R3 (mm) | — | — | — | — | 300 |
| R2' (mm) | — | — | — | — | — |
| Rx (mm) | — | — | — | 4.25 | — |
| d/D | — | — | — | 0.5 | 0.035 |
| d/W | — | — | — | 0.304 | 0.021 |
| Turning Performance | 100 | 104 | 103 | 102 | 105 |
| Uneven Wear Resistance | 2 | 6 | 6 | 6 | 6 |

|  | Present Invention Tire 1 | Present Invention Tire 2 | Present Invention Tire 3 | Comparative Tire 5 | Present Invention Tire 4 |
|---|---|---|---|---|---|
| R0 (mm) | 1000 | 1000 | 1000 | 1000 | 1000 |
| R1 (mm) | 1000 | 1000 | 1000 | 1000 | 1000 |
| R2 (mm) | 250 | 300 | 300 | 300 | 300 |
| R3 (mm) | — | 100 | 100 | 70 | 75 |
| R2' (mm) | — | — | 150 | — | — |
| Rx (mm) | — | — | — | — | — |
| d/D | 0.035 | 0.035 | 0.035 | 0.017 | 0.02 |
| d/W | 0.021 | 0.021 | 0.021 | 0.021 | 0.021 |
| Turning Performance | 106 | 108 | 108 | 103 | 105 |
| Uneven Wear Resistance | 7 | 8 | 8 | 5 | 7 |

|  | Present Invention Tire 5 | Present Invention Tire 6 | Comparative Tire 6 |
|---|---|---|---|
| R0 (mm) | 1000 | 1000 | 1000 |
| R1 (mm) | 1000 | 1000 | 1000 |
| R2 (mm) | 300 | 300 | 300 |
| R3 (mm) | 100 | 100 | 100 |
| R2' (mm) | — | — | — |
| Rx (mm) | — | — | — |
| d/D | 0.06 | 0.1 | 0.12 |
| d/W | 0.021 | 0.021 | 0.021 |
| Turning Performance | 107 | 105 | 103 |
| Uneven Wear Resistance | 8 | 8 | 7 |

As can be seen from Table 1, the present invention tires can effectively improve turning performance and uneven wear resistance.

EXAMPLE 2

Test tires 1~5 were prepared, respectively, each having the same tire size as in Example 1 and the ratio d/W of the depth d of the intersection to the groove width W of the main groove 2 shown in Table 2 in the above present invention tire 2. The curvature radii R0, R1, R2 and R3 of the circular arcs and the ratios d/D were as shown in Table 2.

Evaluation tests for turning performance and uneven wear resistance were conducted on each of the test tires as in Example 1. The results shown in Table 2 were obtained.

TABLE 2

|  | Test Tire 1 | Test Tire 2 | Test Tire 3 | Test Tire 4 | Test Tire 5 |
|---|---|---|---|---|---|
| R0 (mm) | 1000 | 1000 | 1000 | 1000 | 1000 |
| R1 (mm) | 1000 | 1000 | 1000 | 1000 | 1000 |
| R2 (mm) | 300 | 300 | 300 | 300 | 300 |
| R3 (mm) | 100 | 100 | 100 | 100 | 100 |
| d/D | 0.035 | 0.035 | 0.035 | 0.035 | 0.035 |
| d/W | 0.008 | 0.01 | 0.10 | 0.15 | 0.16 |
| Turning Performance | 103 | 106 | 105 | 105 | 103 |
| Uneven Wear Resistance | 3 | 7 | 8 | 8 | 7 |

As seen in Table 2, it is understood that the ratio d/W of the depth d of the intersection to the groove width W of the main groove 2 preferably ranges from 0.01 to 0.15.

As illustrated above, according to the present invention, the ground contact surface of at least a land portion which is located second when counted from the vehicle outer side when the tire is mounted thereon, is arranged so as to have a conventional first circular arc and at least a second circular arc which is connected thereto on the vehicle outer side thereof and has a curvature radius smaller than that of the first circular arc, or so as to have a conventional first circular arc and a curved line which is connected thereto on the vehicle outer side thereof and is formed such that the curved line extends progressively inwardly away from the tread surface to the vehicle outer side end of the curved line, and the ratio d/D of the depth d of the intersection P of the second circular arc or curved line with the vehicle outer sidewall surface of the second land portion is specified in the above range, whereby turning performance and uneven wear resistance can effectively be improved under service conditions which cause a great turning force, such as running of a circuit.

INDUSTRIAL APPLICABILITY

The present invention having the aforementioned excellent effects is very effectively applicable to pneumatic tires to be mounted on a vehicle which runs, for example, a circuit.

What is claimed is:

1. A pneumatic tire having a tread surface having a plurality of main grooves extending straight in a circumferential direction of the tire, land portions extending in the tire circumferential direction being defined by the plurality of main grooves, the land portions each having a ground contact surface comprising a first circular arc $C_1$ having a single curvature radius in tire meridian cross section, wherein the ground contact surface of at least the land portion which is located second when counted from the outer side of a vehicle when the tire is mounted thereon, is arranged so as to have the first circular arc $C_1$ and at least a second circular arc $C_2$ connected thereto on the vehicle outer side thereof, wherein the circular arc located closer to the vehicle outer side has a smaller curvature radius and is positioned more inwardly away from the tread surface, and wherein the ratio d/D of the depth d, measured from a tread surface, of an intersection of the circular arc located closest to the vehicle outer side with a vehicle outer sidewall surface of the second land portion to the groove depth D of the main groove, measured from a wall of the main groove that faces the vehicle outer sidewall surface, is 0.02 to 0.1, such that the vehicle outer sidewall surface of the second land portion has a height that is less than that of the wall of the main groove that faces the vehicle outer sidewall surface of the second land portion, and wherein the ground contact surface of the second land portion has an inner circular arc $C_2'$ connected to the first circular arc $C_1$ on the vehicle inner side thereof, and a third circular arc $C_3$ connected to the second circular arc $C_2$ on a vehicle outer side thereof, and further wherein $R_1 > R_2 > R_2' > R_3$, where $R_1$ is the curvature radius of the first circular arc $C_1$; $R_2$ is the curvature radius of the second circular arc $C_2$, $R_2'$ is the curvature radius of the inner circular arc $C_2'$, and $R_3$ is the curvature radius of the third circular arc $C_3$.

2. A pneumatic tire according to claim 1, wherein the ratio d/W of the depth d to the groove width W of the main groove facing to the vehicle outer sidewall surface is 0.01 to 0.15.

3. A pneumatic tire according to claim 1, wherein the ratio d'/D' of the depth d' of an intersection of the inner circular arc $C_2'$ with a vehicle inner sidewall surface of the second land portion to the groove depth D' of the main groove facing to the vehicle inner sidewall surface is 0.01 to 0.1.

4. A pneumatic tire according to claim 3, wherein the ratio $R_1/R_2'$ is 2 to 10.

5. A pneumatic tire according to claim 1, wherein:

the plurality of main grooves includes three main grooves, defined as a center main groove, a left main groove and a right main groove;

the three main grooves are separated by land portions, and a land portion is formed in a shoulder region of each of the left main groove and the right main groove; and the second land portion is adjacent to the land portion of the shoulder region located on the outer side when the tire is mounted on a vehicle.

* * * * *